A. H. CARTER.
CAR FENDER.
APPLICATION FILED DEC. 1, 1909.

959,309.

Patented May 24, 1910.
2 SHEETS—SHEET 1.

Witnesses
W. G. Jones
P. M. Smith

Inventor
Archie H. Carter
By Victor J. Evans
Attorney

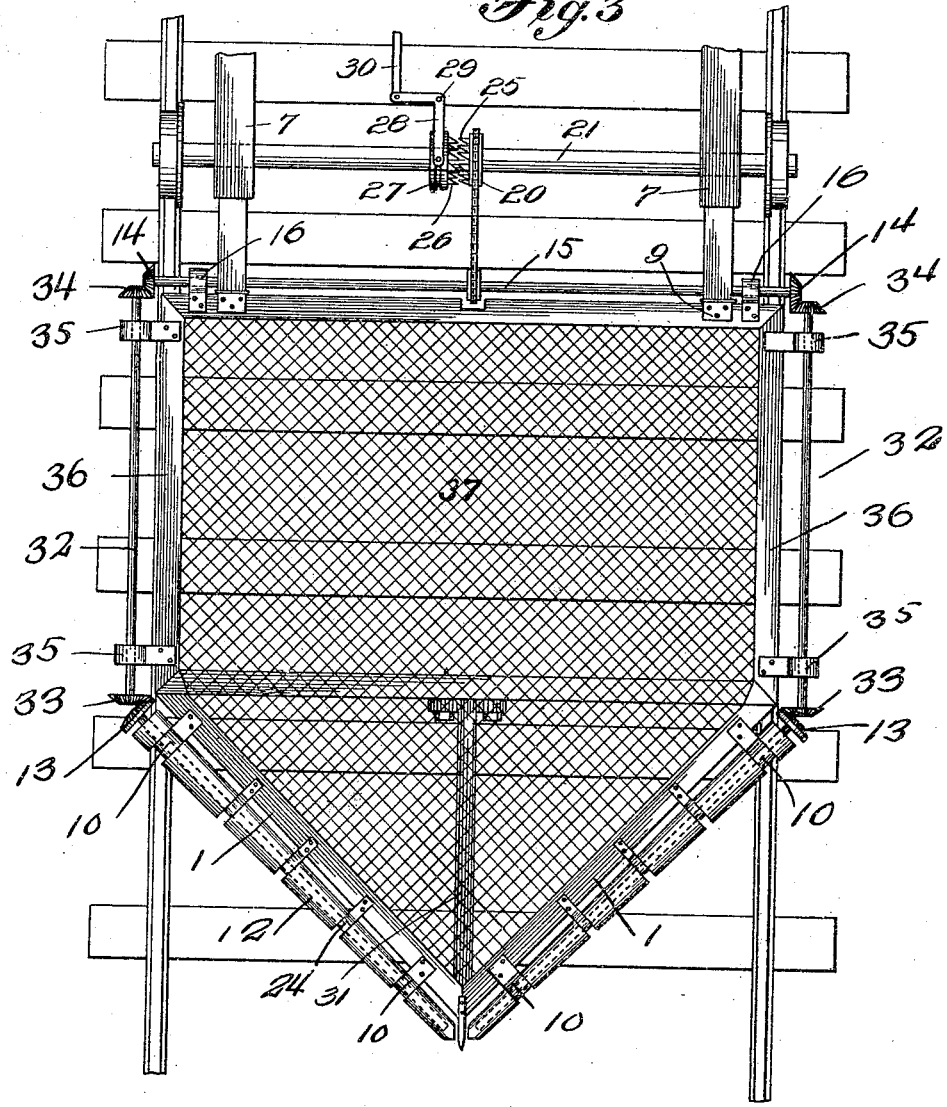

UNITED STATES PATENT OFFICE.

ARCHIE H. CARTER, OF CANTON, OHIO.

CAR-FENDER.

959,309.  Specification of Letters Patent.  Patented May 24, 1910.

Application filed December 1, 1909. Serial No. 530,871.

*To all whom it may concern:*

Be it known that I, ARCHIE H. CARTER, a citizen of the United States, residing at Canton, in the county of Stark and State of Ohio, have invented new and useful Improvements in Car-Fenders, of which the following is a specification.

This invention relates to car fenders, the object of the invention being to provide a car fender embodying means whereby persons and objects are prevented from becoming caught beneath the fender and carried beneath the wheels of the car, the construction involving elements mounted upon the pilot frame of the fender at a low down point, which revolving elements are kept constantly in motion so that the clothing of a person will be prevented from becoming caught between the fender and the road bed, thus rendering the fender much safer and more reliable in its action.

With the above general object in view, the invention consists in the novel construction, combination and arrangement of parts as herein fully described, illustrated and claimed.

Figure 1:
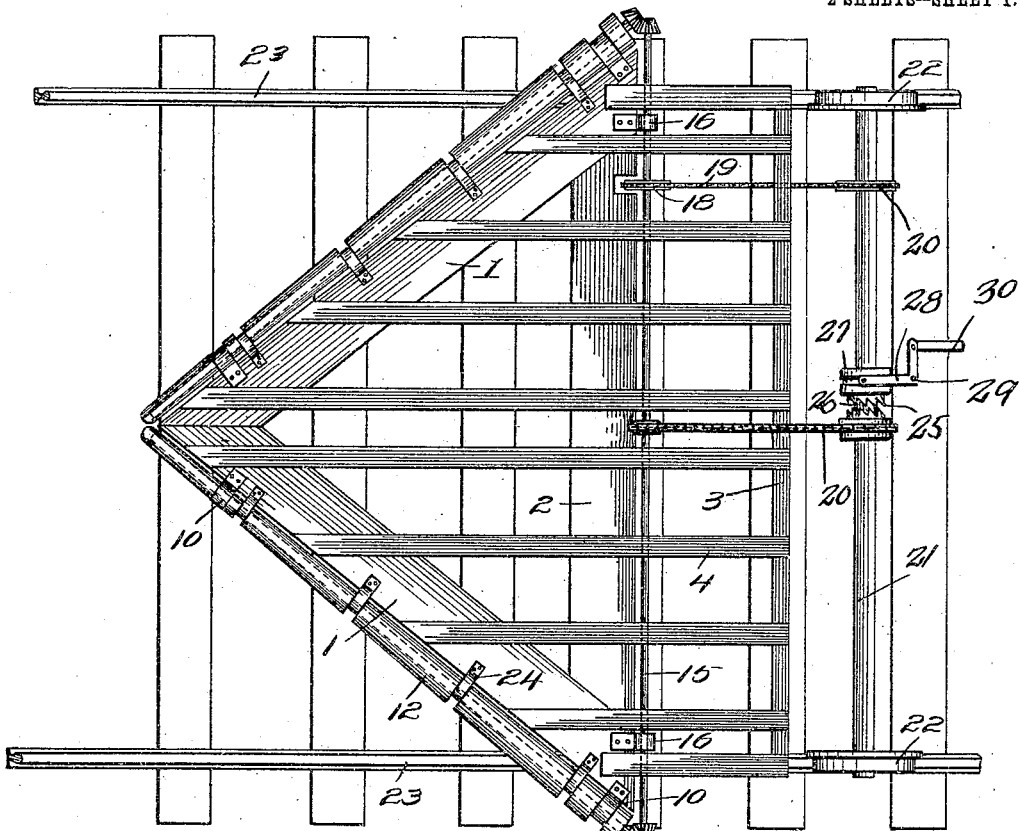
Figure 2:
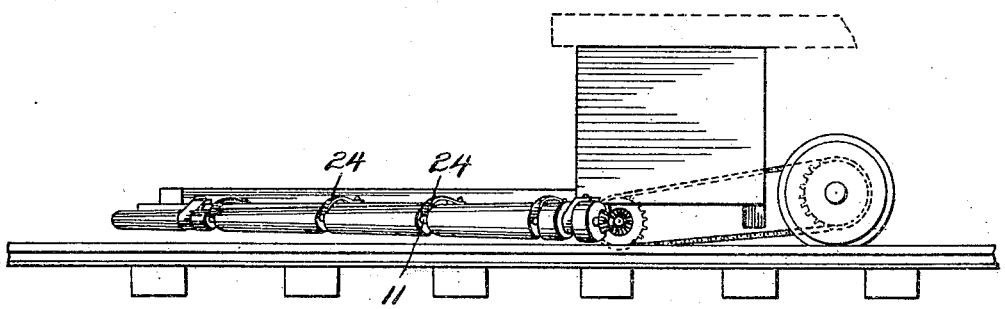

In the accompanying drawings:—Figure 1 is a plan view of a car fender embodying the present invention. Fig. 2 is a side elevation thereof. Fig. 3 is a complete plan view of a modified form of fender, showing the means for throwing the rotary elements of the fender into and out of operation. Fig. 4 is a side elevation of one of the hangers.

The frame of the fender as shown in Fig. 1 is triangular in shape, comprising the forwardly converging side bars 1 and the rear connecting cross bar 2. Back of the cross bar 2 is another cross-bar 3 parallel to the bar 2 and connected thereto by means of parallel slats 4 which extend in the direction of movement of the fender and are connected at their forward ends to the rearwardly diverging side bars 1 as clearly indicated in Fig. 1.

The fender frame above referred to is supported on the car by means of two or more hangers one of which is illustrated in detail in Fig. 4, wherein said hanger is seen as consisting of a metal strap of suitable length bent in the form of a triangular frame or body 5, the upright rear portion of which is adapted to receive screws, bolts, or other fasteners 6 whereby the hangers are fastened to the sills 7 of the car truck or to any other convenient part of the frame of the truck or car. Each hanger also comprises the forwardly extending arm 8 adapted to receive fasteners 9 to connect the same to the fender frame.

Journaled in a suitable number of bearings 10 secured to the forward edge of the bars 1 of the fender frame are shafts 11 of a forwardly converging pair of rollers 12 preferably consisting of rubber to prevent injury to persons when coming in contact therewith. The forward extremities of the rollers 12 are brought close together, as shown in Figs. 1 and 3, while the rear ends of the roller shafts are provided with bevel gear wheels 13 which, as shown in Figs. 1 and 2, mesh with other gear wheels 14 on the opposite extremities of a roll drive shaft 15, the latter being journaled in suitable bearings 16 on the frame, as shown in Figs. 1 and 3. At a suitable point on the shaft 15 there is mounted a sprocket wheel 18 from which a chain 19 extends rearwardly around another sprocket wheel 20 on the forward axle of the truck or car, 22 designating the front wheels of the car which run upon the rails 23. If desired the arrangement shown in Fig. 3 may be substituted for that shown in Fig. 1 and it will be noted in said Fig. 3 that in order to arrange the forward end of the fender farther away from the car and front axle instead of gearing the roll shafts directly to the driving shaft 15, side shafts 32 may be employed, the same being provided with beveled gear wheels 33 and 34 respectively at the front and rear ends thereof which mesh respectively with the beveled gear wheels 13 and 14 above described, the shafts 33 being mounted in suitable bearings 35 on the side bars 36 of the fender frame. This materially increases the area or capacity of the scoop frame by adding the rectangular section 37. It will thus be seen that the motion of the axle 21 is utilized to drive the shaft 15 which in turn imparts rotary motion to the rubber rolls 12, the latter moving in close proximity to, or if desired, in actual contact with the rails 23. When these rolls come in contact with a person, they obtain a frictional hold upon the clothing of the person and prevent such clothing from being dragged under the fender and between the fender and the road-bed or rails, the forward faces of the rolls moving constantly upward and thereby producing the result stated.

24 designates springs secured to the pilot frame and overhanging the shafts of the rolls 12 as best illustrated in Fig. 2, said springs preventing the clothing of a person from becoming caught between the rolls and the forwardly converging bars 1 of the pilot frame.

In order to throw the rolls 12 out of operation, the arrangment shown in Fig. 3 may be employed, the sprocket wheel 20 being mounted loosely on the axle 21 and provided with a clutch face 25 adapted to be engaged by the clutch face 26 of a sliding collar 27 which rotates with the shaft 21 and is adapted to slide thereon, being actuated by means of an elbow shipping-lever 28 engaging a groove in the collar 27 and fulcrumed at 29 on the car or truck frame and adapted to be manipulated by a lever or other suitable connection 30, whereby the clutch collar 27 may be shifted into and out of engagement with the sprocket wheel 20 for the purpose stated.

31 designates a brace interposed between the extreme forward portion of the pilot frame and the rear cross bar 2 thereof as shown in Fig. 3.

I claim:—

A car fender comprising a pilot frame embodying forwardly converging side bars, rolls journaled in bearings on said forwardly converging bars and arranged parallel thereto, each of said rolls comprising a shaft and a plurality of cylindrical roll sections between which the shaft is left uncovered, guard springs secured to the pilot frame and overhanging the shafts of said rolls at the intervals between the roll sections, said guard springs being arched to project above the periphery of the roll sections, a roll drive shaft extending transversely of the direction of movement of the fender and geared to the rear ends of said rolls, sprocket elements connecting said drive shaft with one of the car axles, and a manually operated clutch on the car axle for throwing the sprocket elements into and out of operation.

In testimony whereof I affix my signature in presence of two witnesses.

ARCHIE H. CARTER.

Witnesses:
  Jos. H. McCurdy,
  Luther M. Barrick.